United States Patent
Song et al.

(10) Patent No.: US 8,015,708 B2
(45) Date of Patent: Sep. 13, 2011

(54) METHOD AND APPARATUS FOR MANUFACTURING TONEWHEEL FOR VEHICLES

(75) Inventors: Jae-Hwan Song, Daegu (KR); Jin Hur, Daegu (KR)

(73) Assignee: YUSUNG FT Corporation, Daegu (KR)

( * ) Notice: Subject to any disclaimer, the term of this patent is extended or adjusted under 35 U.S.C. 154(b) by 1394 days.

(21) Appl. No.: 11/442,268

(22) Filed: May 30, 2006

(65) Prior Publication Data

US 2006/0265875 A1 Nov. 30, 2006

(30) Foreign Application Priority Data

May 30, 2005 (KR) .......................... 10-2005-0045580
May 11, 2006 (KR) .......................... 10-2006-0042407

(51) Int. Cl.
*B21D 53/26* (2006.01)

(52) U.S. Cl. ....... 29/894; 29/893.33; 324/166; 324/173; 324/174

(58) Field of Classification Search ................. 29/894, 29/893.33, 893.34, 429; 324/166, 173, 174, 324/207.22, 207.25

See application file for complete search history.

(56) References Cited

U.S. PATENT DOCUMENTS

| | | | | |
|---|---|---|---|---|
| 1,847,926 A | * | 3/1932 | Chase | 29/893.33 |
| 4,795,278 A | * | 1/1989 | Hayashi | 384/448 |
| 4,940,937 A | * | 7/1990 | Hattori | 324/207.22 |
| 5,053,656 A | * | 10/1991 | Hodge | 324/200 |
| 5,111,138 A | * | 5/1992 | Kramer | 324/174 |
| 5,166,611 A | * | 11/1992 | Kujawa et al. | 324/166 |
| 5,793,198 A | * | 8/1998 | Ouchi et al. | 324/174 |
| 6,392,405 B1 | * | 5/2002 | Nishizaki et al. | 324/173 |
| 6,498,475 B2 | * | 12/2002 | Foster et al. | 324/173 |
| 7,425,295 B2 | * | 9/2008 | Mizuta et al. | 264/429 |

* cited by examiner

*Primary Examiner* — David P Bryant
*Assistant Examiner* — Ryan J Walters
(74) *Attorney, Agent, or Firm* — Dickstein Shapiro LLP

(57) ABSTRACT

A method and apparatus for manufacturing a tonewheel for vehicles. The method includes machining a material into a tonewheel shape, manufacturing a semi-finished tonewheel product having a sensing part in which a plurality of sensing holes is formed at regular intervals in a circumferential direction of the sensing part, by machining the tonewheel shape manufactured at the forming step, and manufacturing a finished tonewheel product having a sensing part of which deformation is recovered, by processing the sensing part of the semi-finished tonewheel product, which is deformed to be curved at the sensing-hole machining step, through a restrike mold. The apparatus is capable of performing the method.

5 Claims, 18 Drawing Sheets direction of progression of drawing operation

FIG.19
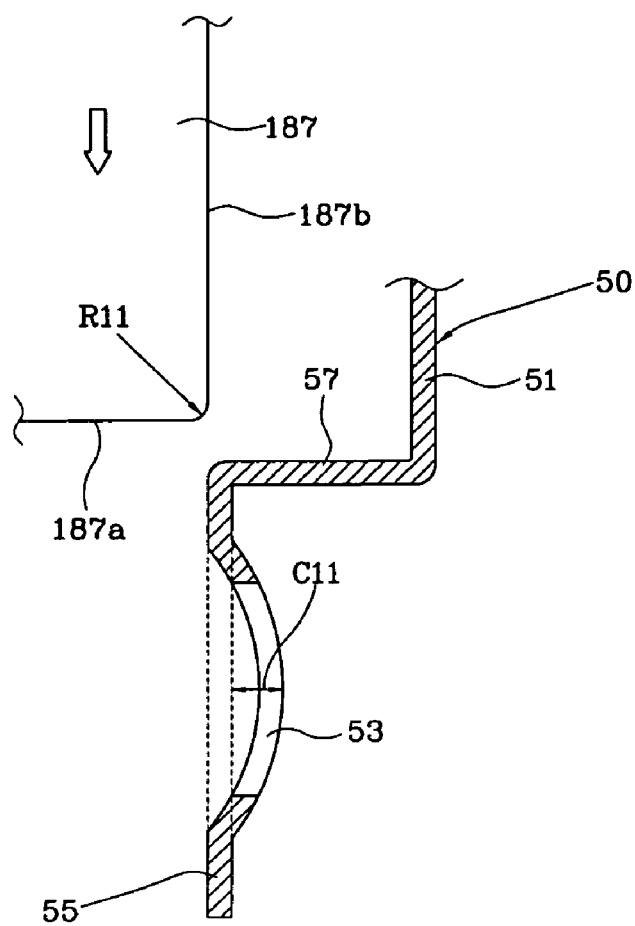
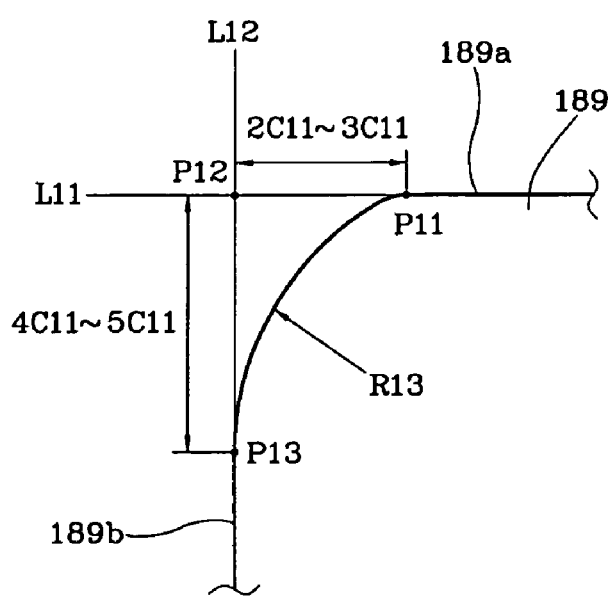

METHOD AND APPARATUS FOR MANUFACTURING TONEWHEEL FOR VEHICLES

FIELD OF THE INVENTION

The present invention relates to a method and apparatus for manufacturing a tonewheel, which is used as a component of a vehicle.

BACKGROUND OF THE INVENTION

Generally, a tonewheel is a component which is mounted to a rotary object so as to sense the rotating speed of the object, such as a drive shaft or a wheel.

For example, FIG. 1 shows a tonewheel 70 which is mounted to a hub 1 of a wheel of a vehicle so as to sense the rotating speed of the wheel.

That is, the tonewheel 70 is press-fitted into the hub 1 of the wheel, and is constructed as shown in FIGS. 2 and 3. Referring to the drawings, the tonewheel 70 includes a boss 71, a sensing part 75, and a coupling part 77. The boss 71 has a cylindrical shape, and is fitted into the hub 1. A plurality of sensing holes 73 is formed along the circumference of the sensing part 75 at regular intervals, thus forming an uneven surface. The coupling part 77 couples the boss 71 to the sensing part 75. Such a tonewheel has the shape of a multistage cylinder.

As shown in FIG. 1, a tonewheel sensor 20 is mounted to a position around the tonewheel 70. The tonewheel sensor 20 senses the pulse generated by the sensing holes 73 of the sensing part 75 when the tonewheel 70 rotates along with the rotary object.

Further, a controller mounted on a vehicle analyses the pulse transmitted from the tonewheel sensor 20, thus allowing the rotating speed of the wheel to be checked in real time.

The tonewheel 70, the tonewheel sensor 20, and the controller are used as essential components of an ABS (Anti-Lock Brake System), a TCS (Traction Control System), or a VDC (Vehicle Dynamic Control System).

Thus, the tonewheel 70 must precisely check the rotating speed of the rotary object, such as a wheel, in real time. To this end, the sensing part 75 sensed by the tonewheel sensor 20 must have very precise flatness and a uniform sectional thickness. Further, the uniformity of the shapes and intervals of the sensing holes 73 must be very high.

Unless the flatness of the sensing part 75 is precise and the sectional thickness is uniform, the uniformity of the shapes and intervals of the sensing holes 73 is lowered. This undesirably increases the defect rate of the tonewheel 70.

SUMMARY OF THE INVENTION

Embodiments of the present invention is to provide a method and apparatus for manufacturing a tonewheel for vehicles, which is constructed so that a sensing part has very precise flatness and uniform sectional thickness, and the uniformity of the shapes and intervals of sensing holes formed in the sensing part is very high, thus minimizing the defect rate of the tonewheel.

A method of manufacturing a tonewheel for vehicles according to one embodiment of the present invention includes a shaping step of manufacturing a first semi-finished tonewheel product having a boss, a sensing part, and a coupling part, by shaping a material having a shape of a flat sheet through a progressive mold, a preliminary machining step of manufacturing a second semi-finished tonewheel product having a sensing part which has a uniform sectional thickness in a vertical direction and an outside surface of which is very precisely flat, by machining the first semi-finished tonewheel product through a strike mold; a sensing-hole machining step of manufacturing a third tonewheel product having a sensing part in which a plurality of sensing holes is formed at regular intervals in a circumferential direction of the sensing part, by machining the second semi-finished tonewheel product through a cam piercing mold; and a deformation recovery step of manufacturing a finished tonewheel product having a sensing part which has a uniform sectional thickness and has a vertical straight-line shape, by processing the sensing part of the third semi-finished tonewheel product, which is deformed to be inwardly curved at the sensing-hole machining step, through a restrike mold.

An apparatus for manufacturing a tonewheel for vehicles according to another embodiment of the present invention includes a strike mold having an upper mold die and a lower mold punch to process a sensing part, having a non-uniform sectional thickness in a vertical direction, from a first semi-finished tonewheel product manufactured through a progressive mold, thus manufacturing a second semi-finished tonewheel product having a sensing part which is uniform in sectional thickness and is very precise in flatness of an outside surface; and a restrike mold having an upper mold pad, an upper mold die, and a lower mold punch to process a sensing part, deformed to be inwardly curved, from a third semi-finished tonewheel product manufactured to have a sensing hole through a cam piercing mold, thus manufacturing a finished tonewheel product having a sensing part which has a uniform sectional thickness and a vertical straight-line shape.

BRIEF DESCRIPTION OF THE DRAWINGS

For a better understanding of the nature and objects of the present invention, reference should be made to the following detailed description with the accompanying drawings, in which:

FIG. 19 illustrates a step in a manufacturing method of a tonewheel, in accordance with a disclosed embodiment.

DETAILED DESCRIPTION OF THE PREFERRED EMBODIMENTS

FIGS. 4 through 19 are views illustrating a method and apparatus for manufacturing a tonewheel, according to the present invention.

Figure 4:
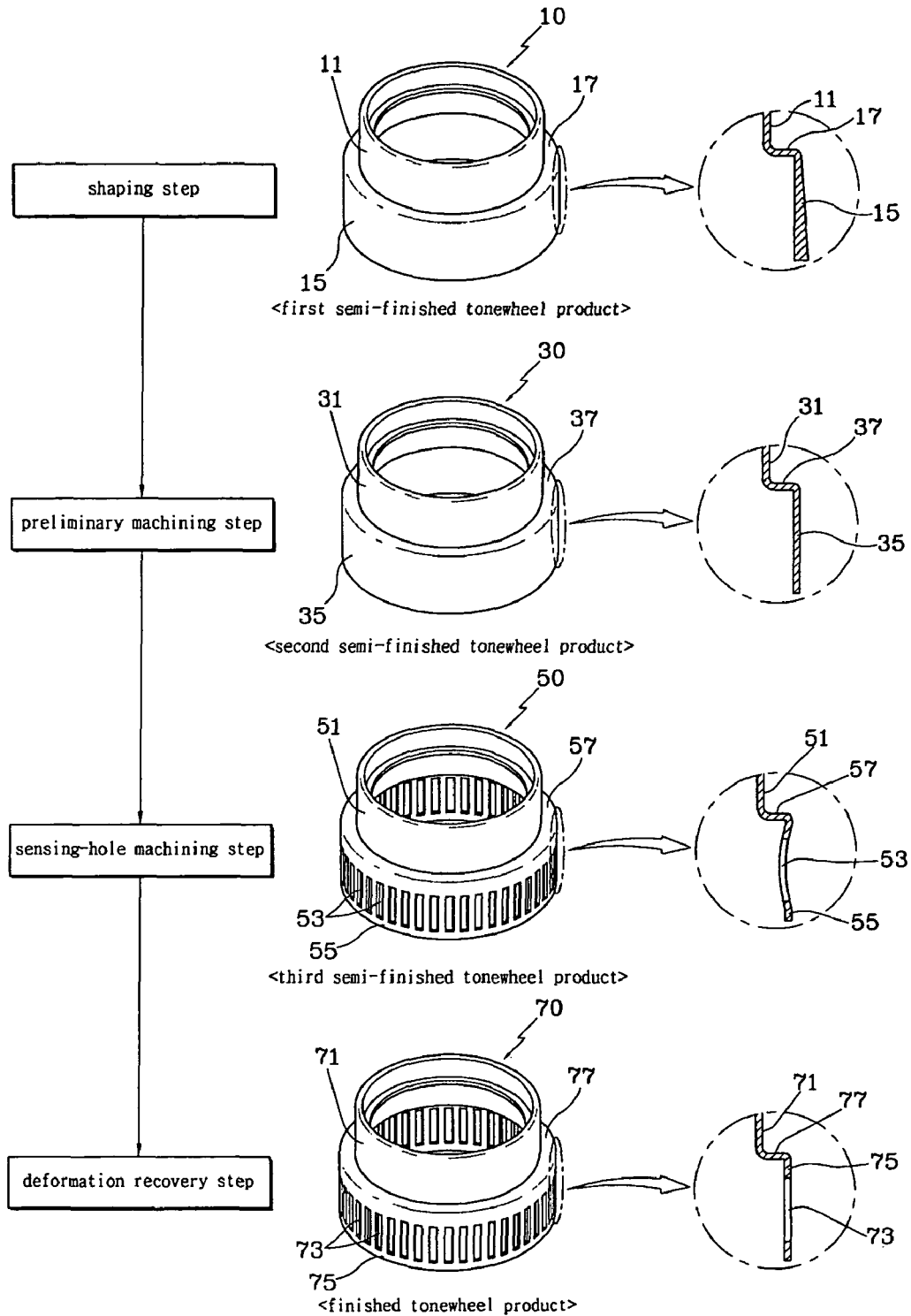
FIG. 4 illustrates a method for manufacturing a tonewheel, in accordance with a disclosed embodiment.

As shown in FIG. 4, the tonewheel manufacturing method of the present invention includes a shaping step of manufacturing a first semi-finished tonewheel product 10, a preliminary machining step of manufacturing a second semi-finished tonewheel product 30, a sensing-hole machining step of manufacturing a third semi-finished tonewheel product 50, and a deformation recovery step of manufacturing a finished tonewheel product 70.

Figure 5:
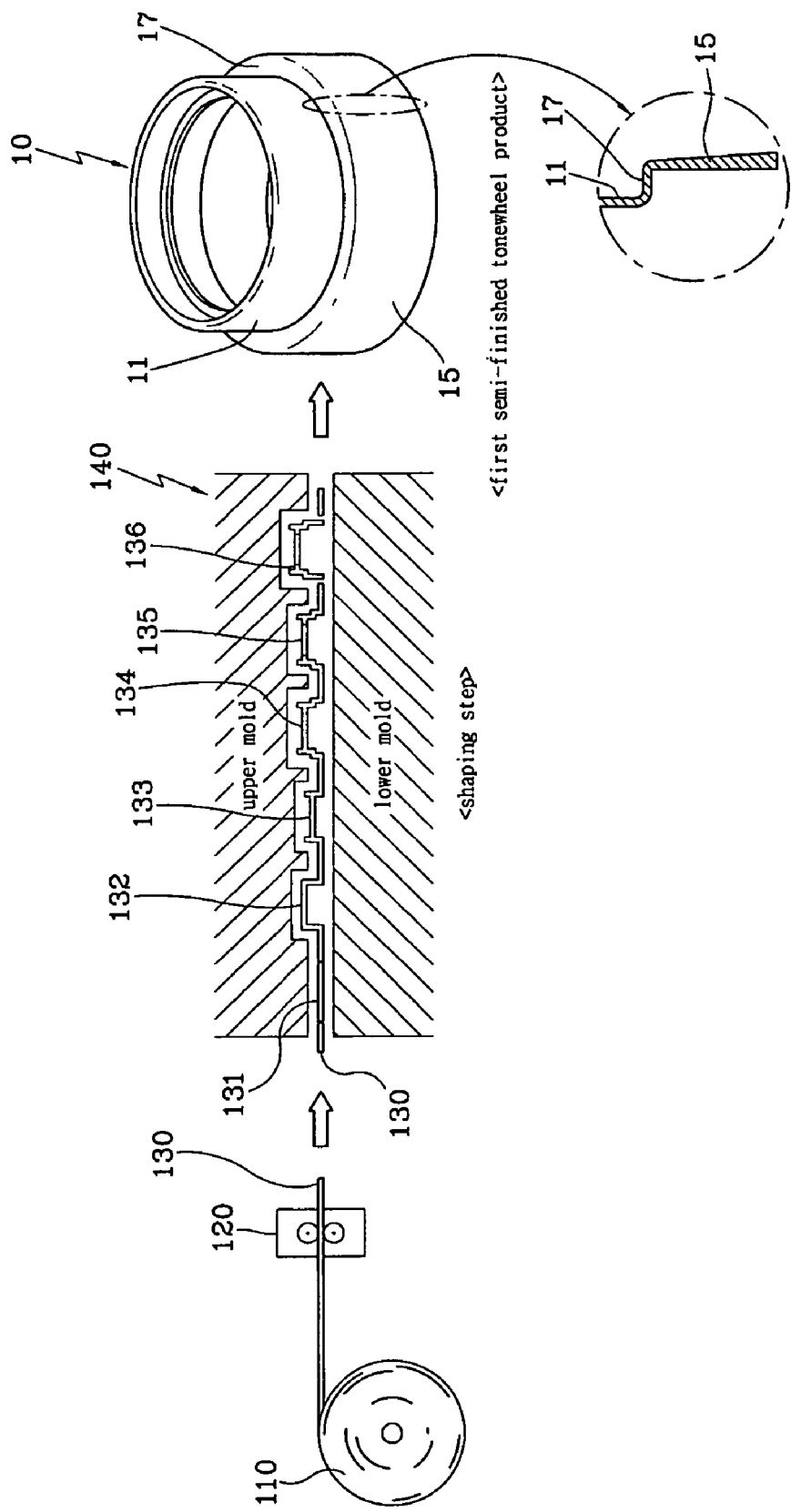
FIG. 5 illustrates a step in a manufacturing method of a tonewheel, in accordance with a disclosed embodiment.

As shown in FIG. 5, at the shaping step, a material 110 wound in a roll shape is flattened using a roller unit 120. The flattened material 130 is processed using a progressive mold 140, thus manufacturing the first semi-finished tonewheel product 10 having a boss 11, a sensing part 15, and a coupling part 17.

The material 130 is a soft steel sheet which is flattened while passing through the roller unit 120.

Figure 6:
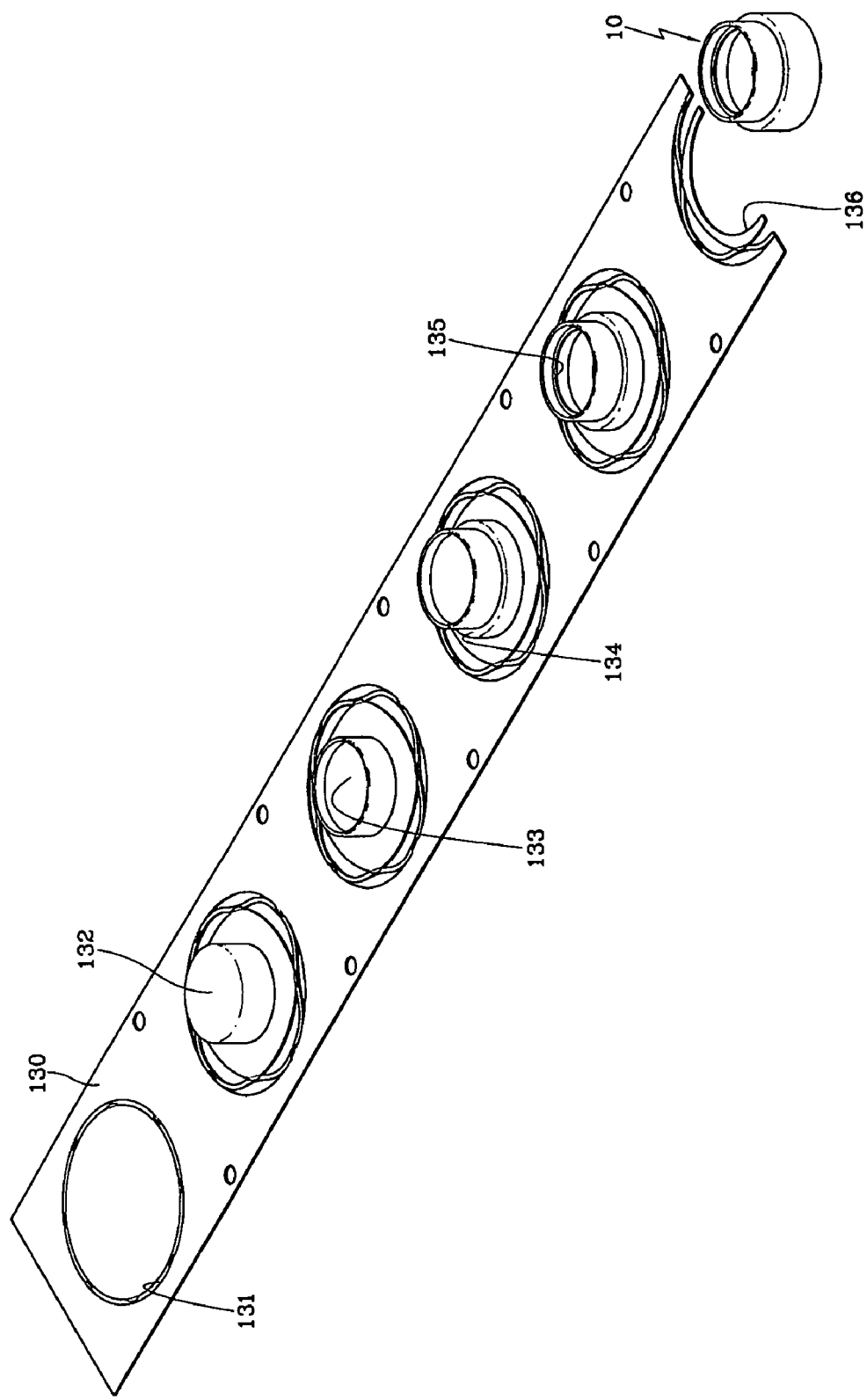
FIG. 6 illustrates the progressive mold shown in FIG. 5 in more detail.

The progressive mold 140 is a device which performs a plurality of operations at one time while sequentially feeding the flattened material 130. As shown in FIG. 6, the material 130 is processed in the progressive mold 140 by sequentially performing a slitting operation 131, a primary drawing operation 132, a forming operation 133, a secondary drawing operation 134, an inner-diameter piercing operation 135, and a third drawing and cutting operation 136, thus manufacturing the first semi-finished tonewheel product 10.

In this case, the number of drawing operations may be limited according to the kind of tonewheel. Of course, the forming operation may be omitted.

As shown in the drawing, the first semi-finished tonewheel product 10 has only a boss 11 having a cylindrical shape, the sensing part 15, and the coupling part 17.

Figure 7:
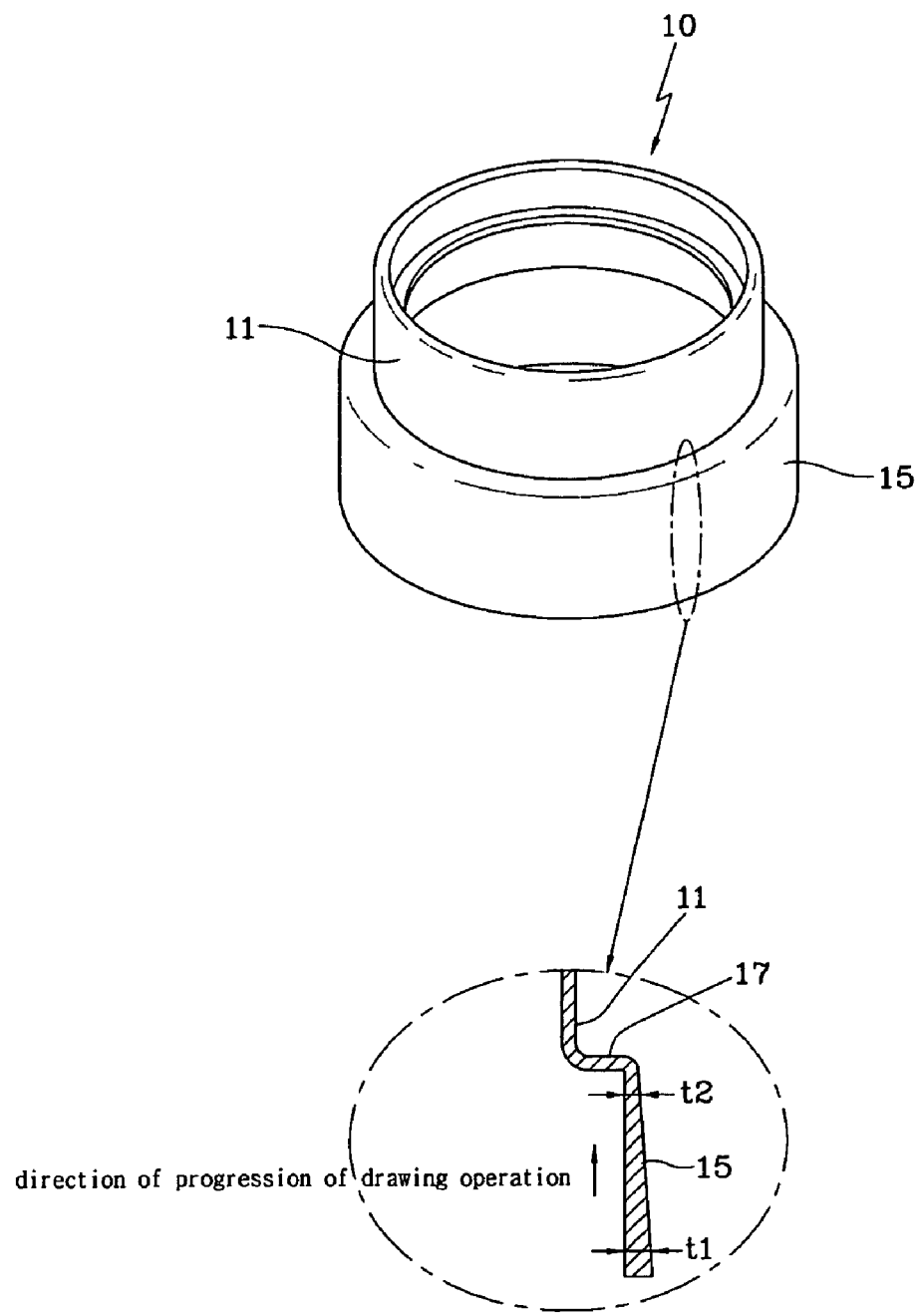
FIG. 7 illustrates a semi-finished tonewheel product in accordance with a disclosed embodiment.

Meanwhile, as shown in FIG. 7, in the first semi-finished tonewheel product 10 manufactured through the shaping step, the sectional thickness of the sensing part 15 is gradually changed according to the direction of the drawing operation, in consideration of the characteristics of the drawing operation performed in the progressive mold 140.

The reason for this is because the deformation and the elongation variation of the material 130 occur simultaneously due to the pressure applied by the progressive mold 140 during the drawing operation. Consequently, the first semi-finished tonewheel product 10 is formed such that the thickness t1 of the lower end adjacent to the material 130 is larger than the thickness t2 of the upper end distant from the material 130.

That is, in the drawing operation, the deformation occurs at the lower end of the sensing part 15 by the progressive mold 140, whereas the deformation and the elongation variation simultaneously occur at the upper end of the sensing part 15. Thereby, the sensing part 15 is manufactured such that its sectional thickness is gradually changed along the direction of progression of the drawing operation.

As such, when the sectional thickness of the sensing part 15 is not uniform, the flatness of the outside surface of the sensing part 15 is not precise. Thus, this increases the defect rate of a finished tonewheel product.

Figure 8:
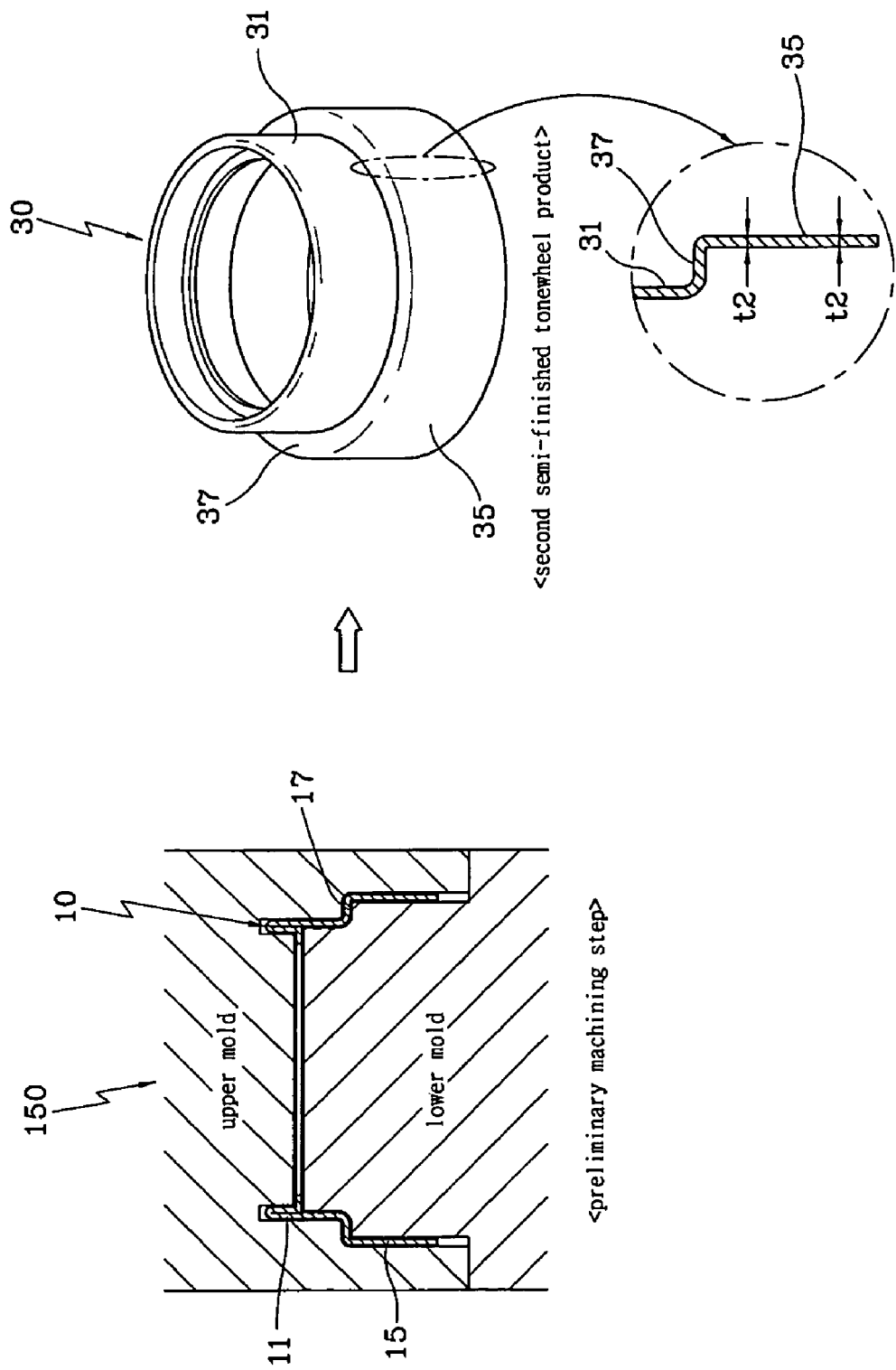
FIG. 8 illustrates a semi-finished tonewheel product in accordance with a disclosed embodiment.

Thus, according to the present invention, the first semi-finished tonewheel product 10 obtained through the shaping step goes through the preliminary machining step. At the preliminary machining step, the first semi-finished tonewheel product 10 is processed using a strike mold 150, as shown in FIG. 8, so that a second semi-finished tonewheel product 30 having the sensing part 35, which has a uniform sectional thickness in a vertical direction and very precise flatness on the outside surface of the sensing pad, is obtained.

Figure 9:
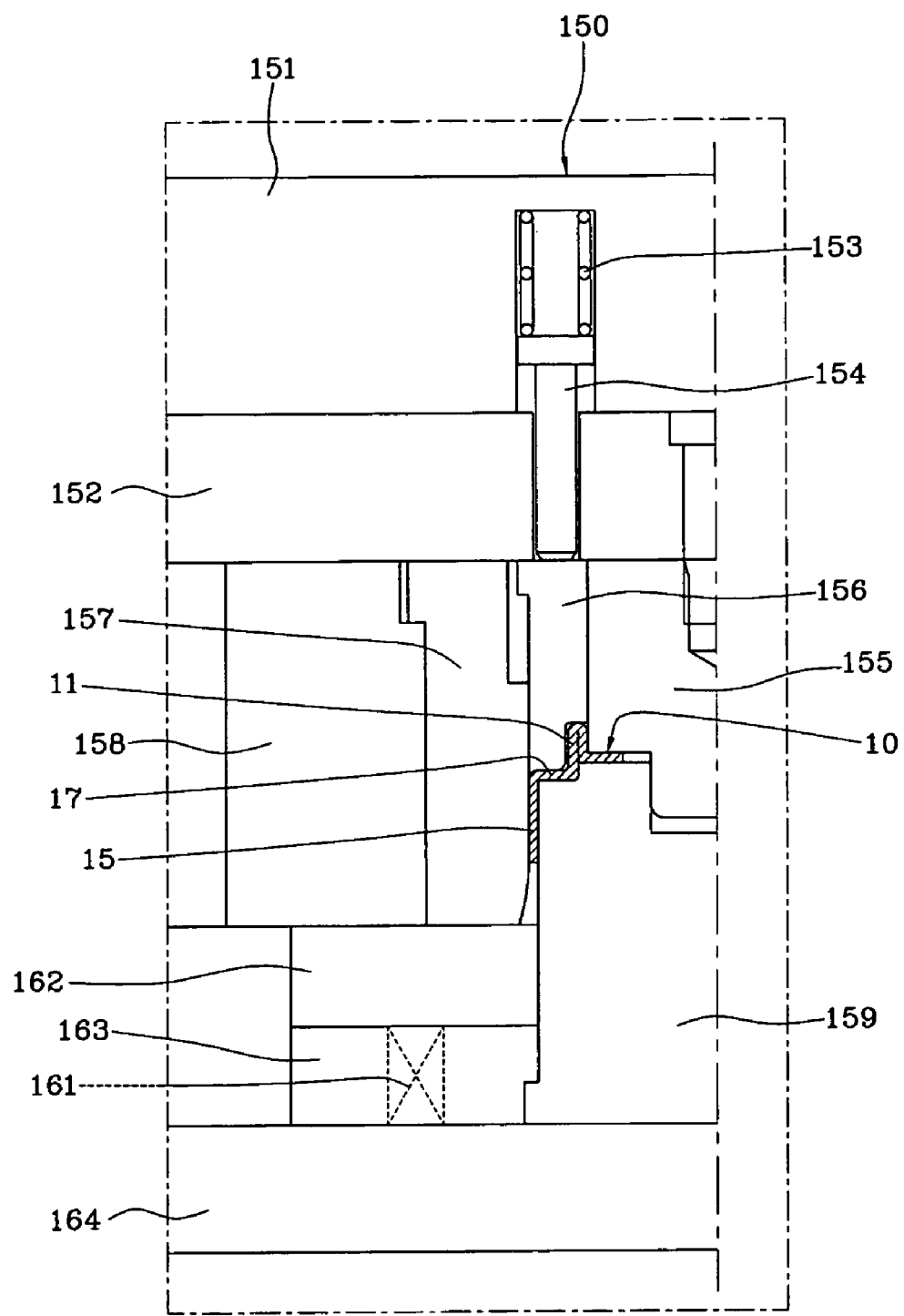
FIG. 9 illustrates a step in a manufacturing method of a tonewheel, in accordance with a disclosed embodiment.

The strike mold 150 includes an upper mold and a lower mold. As shown in FIG. 9, the upper mold includes an upper mold base plate 151, a backup plate 152, a pusher pin 154 installed to be biased downwards by a spring 153, an upper mold punch 155, an upper mold pad 156, an upper mold die 157, and an upper mold holder 158. The lower mold includes a lower mold punch 159, a lifter 162 installed to be biased upwards by a spring 161, a lower mold holder 163, and a lower mold base plate 164.

Figure 10:
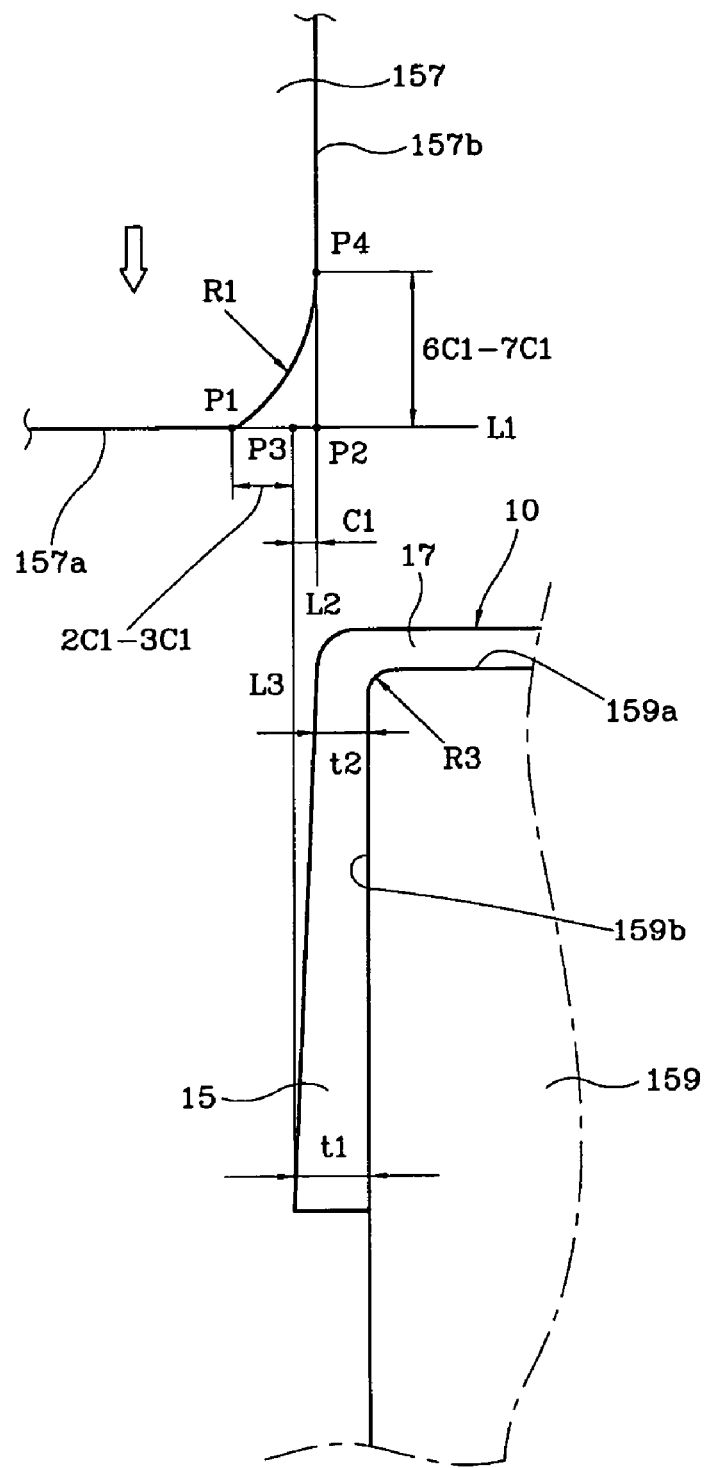
FIG. 10 illustrates a step in a manufacturing method of a tonewheel, in accordance with a disclosed embodiment.
Figure 11:
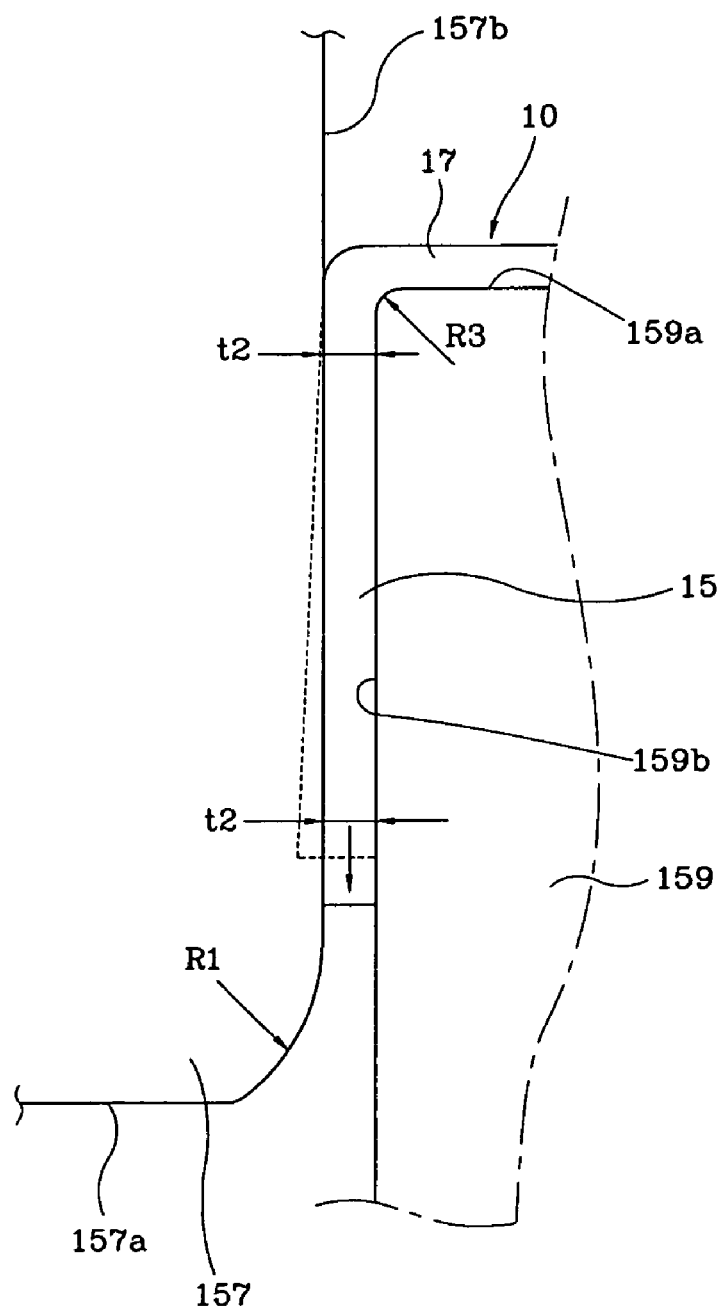
FIG. 11 illustrates a step in a manufacturing method of a tonewheel, in accordance with a disclosed embodiment.

That is, as shown in FIGS. 9 and 10, the first semi-finished tonewheel product 10 is seated on the lower mold punch 159. In such a state, the upper mold of the strike mold 150 moves downwards. At this time, as shown in FIG. 11, the upper mold die 157 provided on the upper mold inwardly presses the outer circumferential surface of the sensing part 15 of the first semi-finished tonewheel product 10, so that the lower end of the sensing part 15 corresponding to the thick portion t1 is pressed by the upper mold die 157, and the thickness of the lower end is thus reduced. A volume corresponding to the reduced thickness extends downwards from the sensing part 15. Thereby, the overall length of the sensing part 15 is increased.

As a result, the second semi-finished tonewheel product 30 having the sensing part 37, in which the upper and lower ends have completely uniform thickness t2 and the outside surface has very precise flatness, is manufactured. Meanwhile, the upper mold die 157 of the strike mold 150 is constructed so that a corner where a base surface 157a and an inside surface 157b meet is formed as a rounded part R1 having a predetermined curvature. Further, the lower mold punch 159 is constructed so that a corner where an upper surface 159a and an outside surface 159b meet is formed as a rounded part R3 having a predetermined curvature. In this case, the rounded part R1 of the upper mold die 157 has a curvature larger than the rounded part R3 of the lower mold punch 159.

The lower mold punch 159 is the component that seats the first semi-finished tonewheel product 10 at the preliminary machining step. Thus, the rounded part R3 of the lower mold punch 159 may be designed to have a minimum curvature which is required simply to support the junction between the sensing part 15 and the coupling part 17.

However, the upper mold die 157 is the component that directly processes the sensing part 15 of the first semi-finished tonewheel product 10 at the preliminary machining step. Thus, the rounded part R1 of the upper mold die 157 must be formed to have a radius of curvature which is at least several times as large as that of the rounded part R3 of the lower mold punch 159.

The smaller the curvature of the rounded part R1 is, the more scratches will be formed on the sensing part 35 of the second semi-finished tonewheel product 30. Further, the flatness of the outside surface may not be precise.

Thus, an intersection point P2 is fixed at a position where a horizontal extension line L1 of the base surface 157a and a vertical extension line L2 of the inside surface 157b meet, and an intersection point P3 is fixed at a position where the horizontal extension line L1 and an extension line L3 extending vertically from a portion of the sensing part 15 of the first semi-finished tonewheel product 10 having the thickest section meet. In this case, a point P1 where the rounded part R1 starts on the base surface 157a of the upper mold die 157 is preferably set to a point which is spaced apart from the intersection point P3 by an interval which is two to three times as large as an interval C1 between the intersection points P2 and P3 and is located along the horizontal extension line L1 in a direction opposite the intersection point P2. However, the point P1 is not limited to the above-mentioned position.

Further, a point P4 where the rounded part R1 starts on the inside surface 157b of the upper mold die 157 is preferably set to a point which is spaced apart from the intersection point P2 by an interval which is six to seven times as large as the interval C1 between the intersection points P2 and P3 and is located along the vertical extension line L2. However, the point P4 is not limited to the above-mentioned position.

In order to prevent the upper mold die 157 from being damaged and enhance the quality of the second semi-finished tonewheel product 30 at the preliminary machining step, the entire surface of the upper mold die 157 is coated. In this case, the coating process is carried out using tin.

Figure 12:
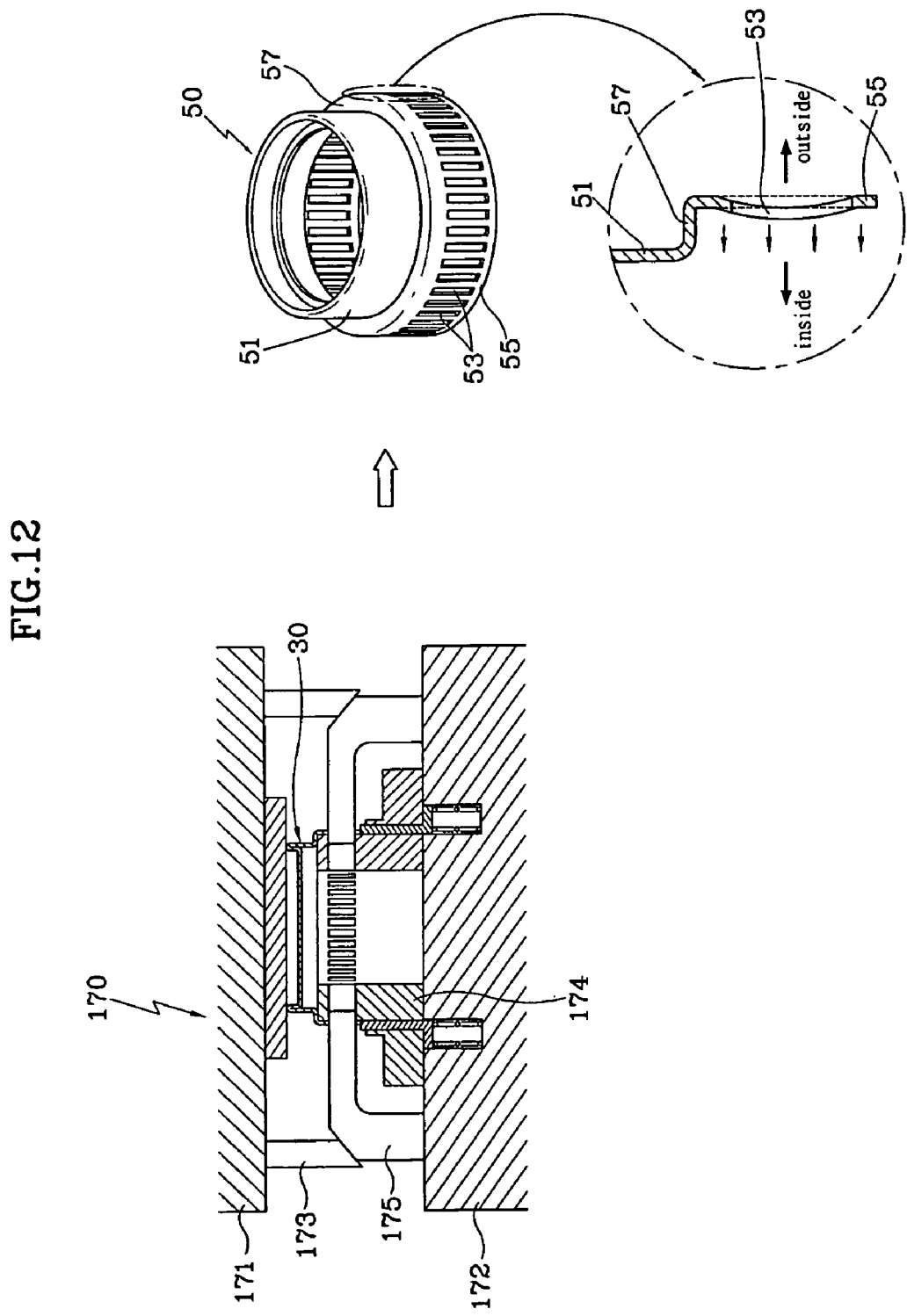
FIG. 12 illustrates a step in a manufacturing method of a tonewheel, in accordance with a disclosed embodiment.

As such, the second semi-finished tonewheel product 30, which has been processed at the preliminary machining step, goes through a subsequent step, which is the sensing-hole machining step. At the sensing-hole machining step, as shown in FIG. 12, the second semi-finished tonewheel product 30 is processed using a cam piercing mold 170, so that a third semi-finished tonewheel product 50 having a sensing part 55 in which a plurality of sensing holes 53 is circumferentially formed at regular intervals is obtained.

Figure 13:
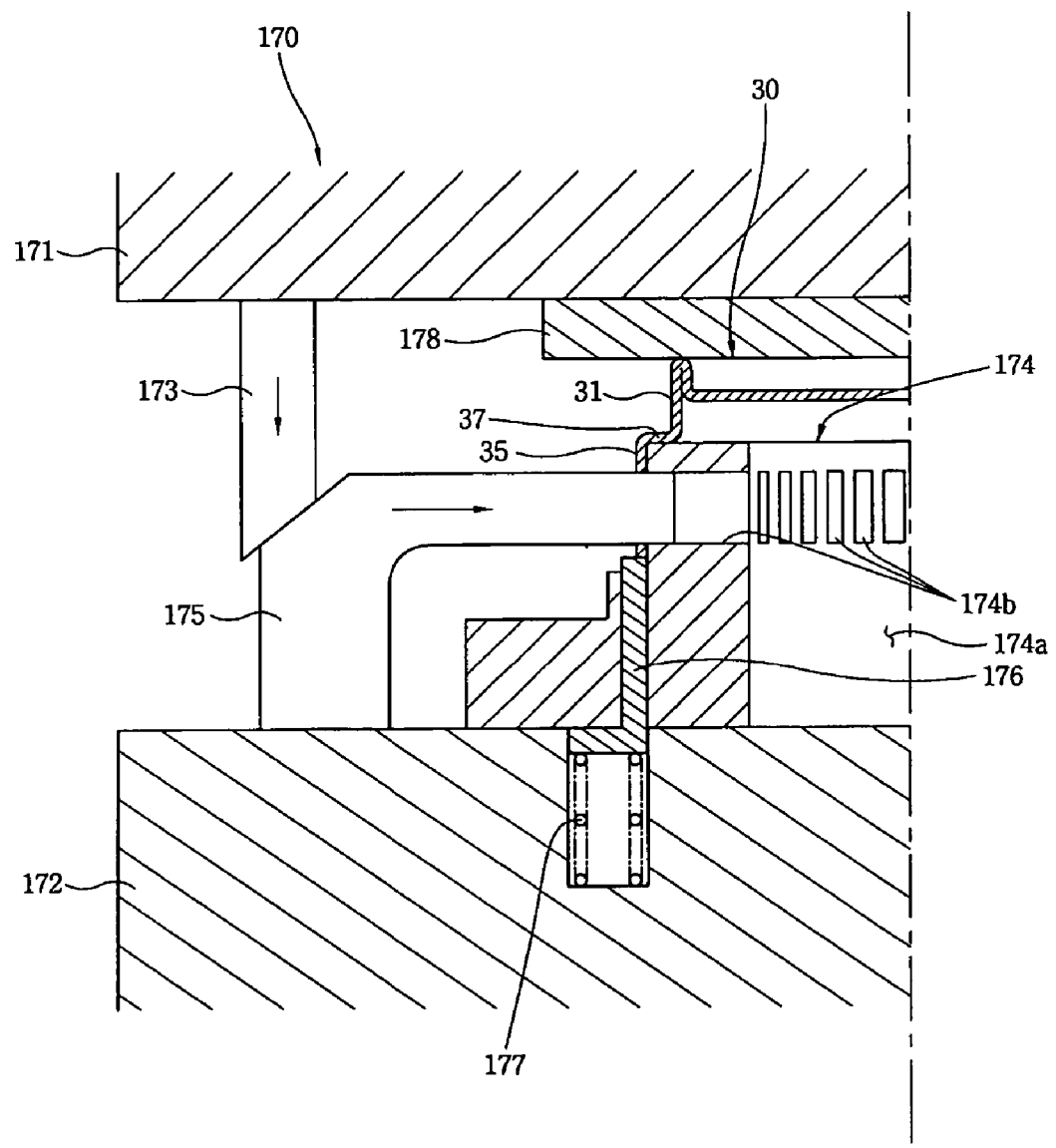
FIG. 13 illustrates the cam piercing mold shown in FIG. 12 in more detail.

As shown in FIG. 13, the cam piercing mold 170 includes an upper mold 171 and a lower mold 172. A cam drive 173 and a press pad 178 are integrally provided on the upper mold 171 in such a way as to protrude toward the lower mold 172. A sensing hole forming block 174 and a piercing punch 175 are provided on the lower mold 172. The sensing hole forming block 174 functions to seat the second semi-finished tonewheel product 30 thereon. The piercing punch 175 moves rectilinearly when it contacts the cam drive 173, thus forming a sensing hole in the second semi-finished tonewheel product 30.

Further, a lifter 176 is mounted to the lower mold 172 to be biased upwards by a spring 177.

A plurality of cam drives 173 and a plurality of piercing punches 175 are arranged along the circumference of the sensing hole forming block 174 at regular intervals.

A hollow hole 174a is formed in the central portion of the sensing hole forming block 174 to pass through the upper and lower surfaces thereof. A plurality of slits 174b is formed along the outer circumference of the upper end of the sensing hole forming block 174 at regular intervals. The slits 174b are holes into which the piercing punches 175 are inserted. The number of slits 174b is equal to the number of piercing punches 175.

That is, the cam drives 173 and the piercing punches 175, numbering the same as the sensing holes formed in the tonewheel, are provided on the circumference of the cam piercing mold 170. Thus, when the upper mold 171 is driven once, a desired number of sensing holes is integrally formed in the sensing part of the tonewheel.

Thus, as shown in FIG. 13, when the second semi-finished tonewheel product 30 is mounted on the sensing hole forming block 174 of the cam piercing mold 170 and the upper mold 171 moves downwards, the cam drives 173 press the piercing punches 175. Thereby, the piercing punches 175 slide toward the sensing hole forming block 174, as shown by the arrow in the drawing. An end of each piercing punch 175 passes through the sensing part 35 of the second semi-finished tonewheel product 30 to be located inside each slit 174b.

Consequently, the third semi-finished tonewheel product 50, having the sensing part 55 in which a plurality of sensing holes 53 is circumferentially formed at regular intervals, is obtained from the second semi-finished tonewheel product 30.

Figure 14:
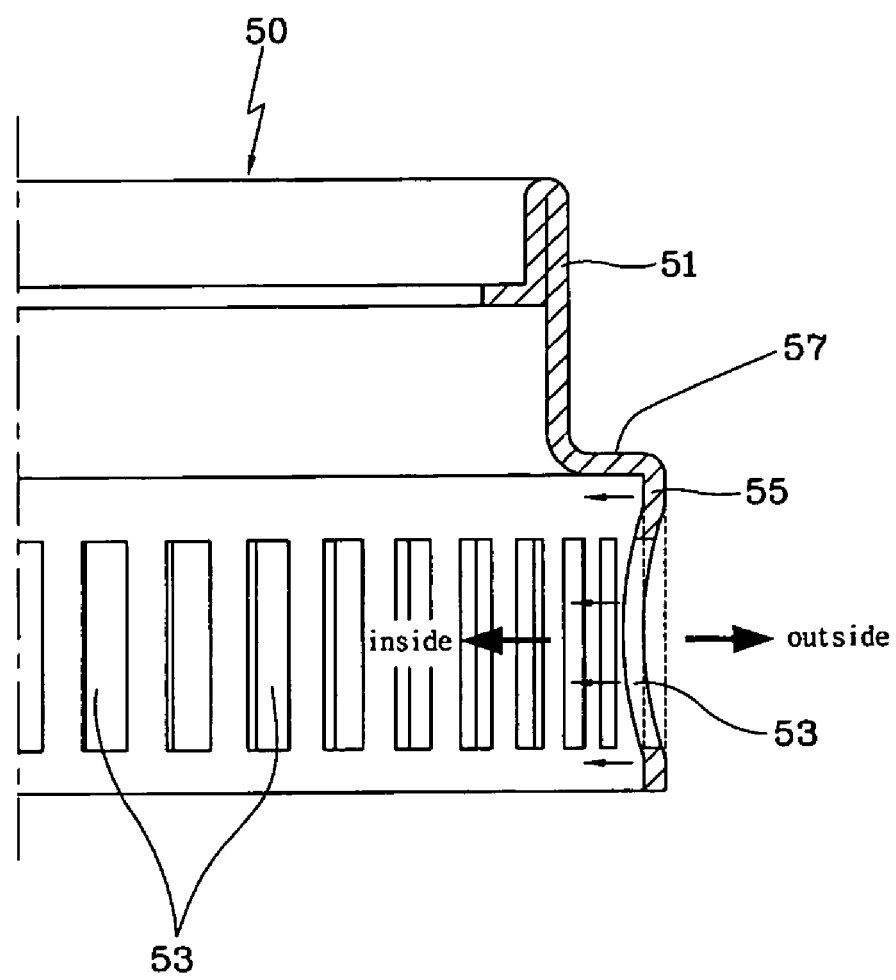
FIG. 14 illustrates a semi-finished tonewheel product in accordance with a disclosed embodiment.

Meanwhile, when the third semi-finished tonewheel product 50 having the sensing holes 53 is manufactured in the sensing-hole machining step, the sensing holes 53 and a portion of the sensing part 55 around the sensing holes 53 may be inwardly curved or deformed by the punching power of the piercing punches 175, as shown in FIG. 14.

Figure 15:
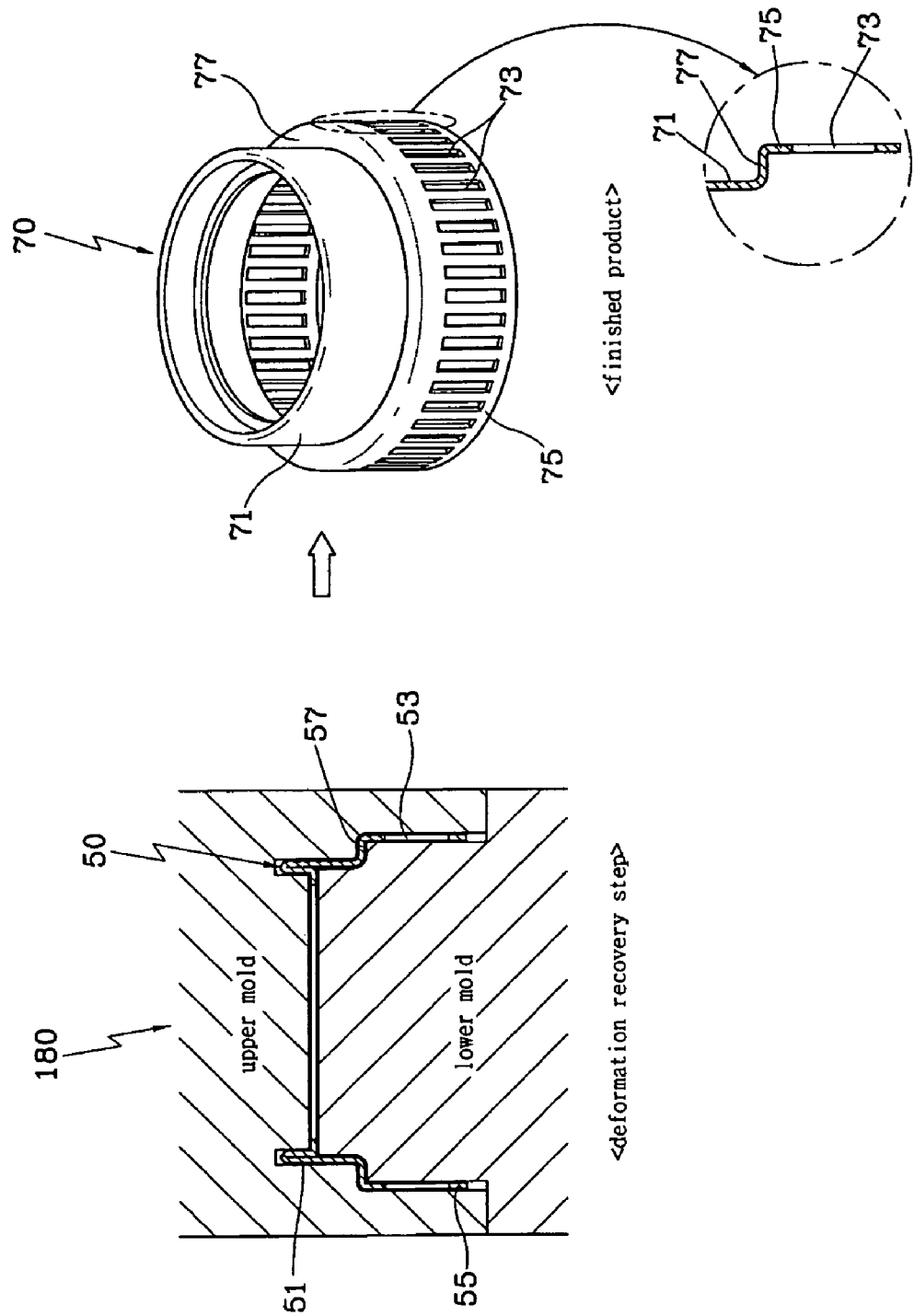
FIG. 15 illustrates a step in a manufacturing method of a tonewheel, in accordance with a disclosed embodiment.

Thus, the third semi-finished tonewheel product 50 obtained through the sensing-hole machining step is processed using a restrike mold 180, as shown in FIG. 15, so that a finished tonewheel product 70 having a sensing part 75, which is uniform in sectional thickness and has a vertical straight-line shape, is obtained.

That is, the sensing part 55, which is inwardly curved after the sensing-hole machining step has been performed, is pulled outwards during the operation using the restrike mold 180, so that the sensing part 55 is returned to its original shape. Thereby, the finished tonewheel product 70, having a sensing part 75 which is uniform in sectional thickness and has a vertical straight-line shape, is obtained.

Figure 16:
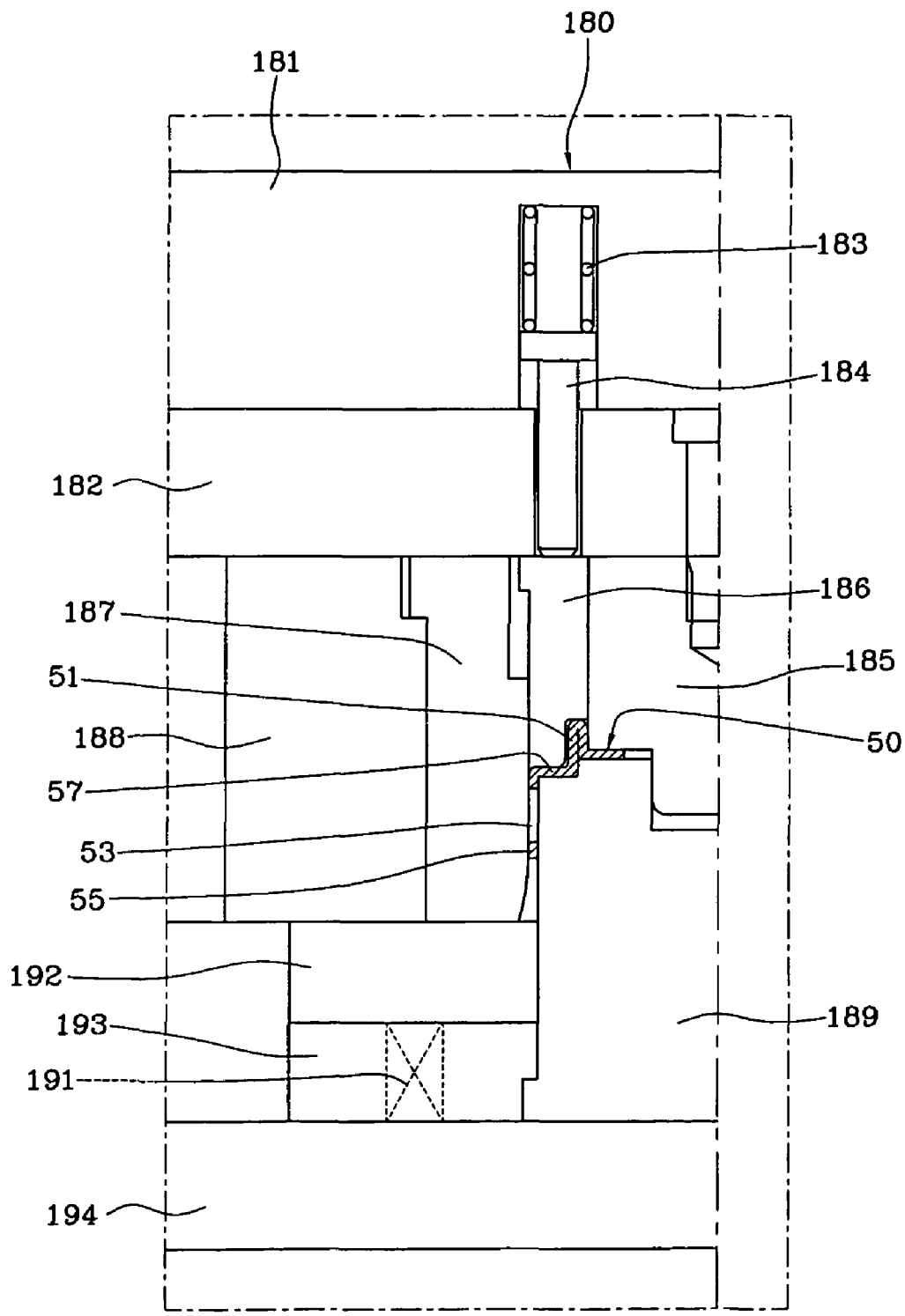
FIG. 16 illustrates the restrike mold shown in FIG. 15 in more detail.

In this case, the restrike mold 180 is divided into an upper mold and a lower mold. As shown in FIG. 16, the upper mold includes an upper mold base plate 181, a backup plate 182, a pusher pin 184 installed to be biased downwards by a spring 183, an upper mold punch 185, an upper mold pad 186, an upper mold die 187, and an upper mold holder 188. The lower mold includes a lower mold punch 189, a lifter 192 installed to be biased upwards by a spring 191, a lower mold holder 193, and a lower mold base plate 194.

Figure 17:
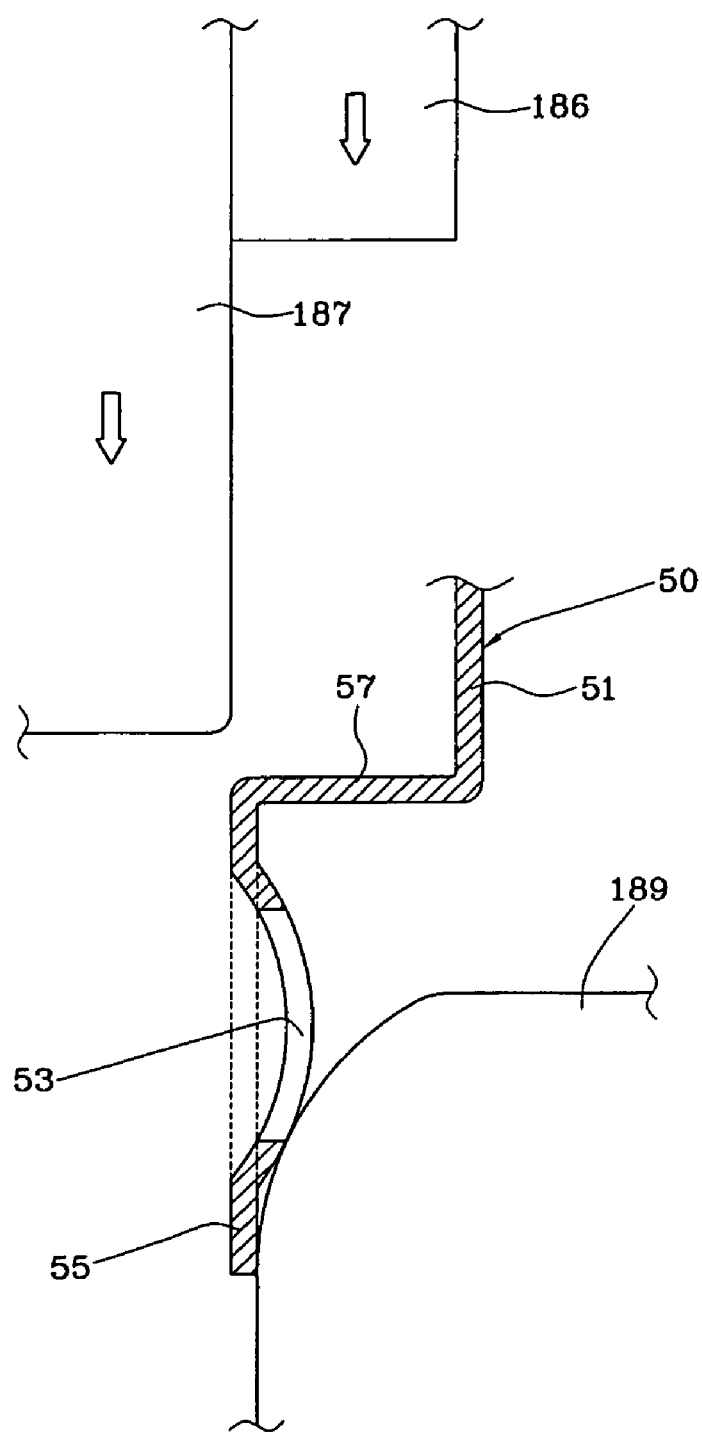
FIG. 17 illustrates a step in a manufacturing method of a tonewheel, in accordance with a disclosed embodiment.
Figure 18:
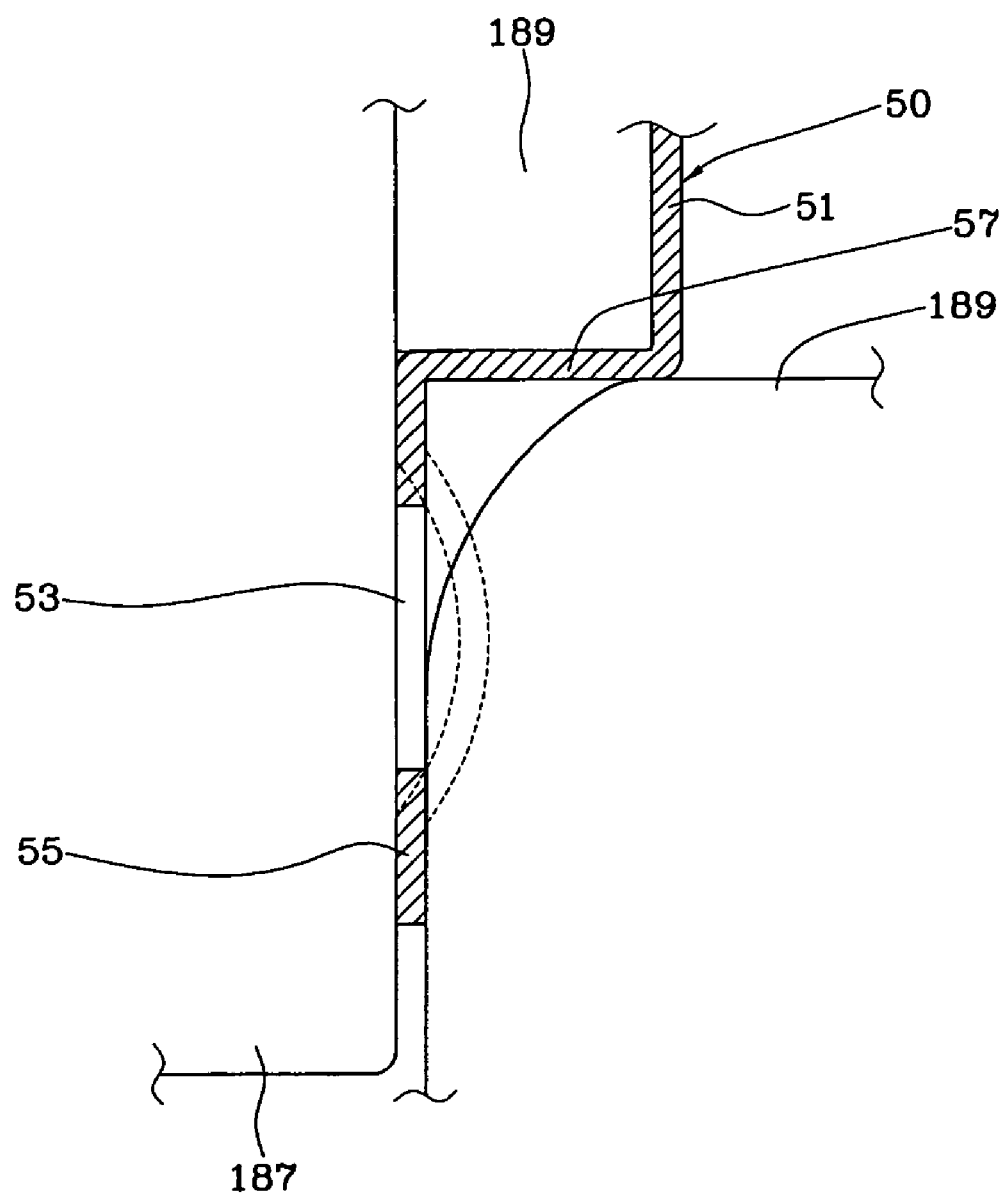
FIG. 18 illustrates a step in a manufacturing method of a tonewheel, in accordance with a disclosed embodiment.

That is, after the third semi-finished tonewheel product 50 is seated on the lower mold punch 189, as shown in FIGS. 16 and 17, the upper mold of the strike mold 150 is moved downwards. At this time, the upper mold pad 186, provided on the upper mold, presses and pushes down the coupling part 57 of the third semi-finished tonewheel product 50, as shown in FIG. 18. Simultaneously, the upper mold die 187 supports the outer circumferential surface of the sensing part 55 of the third semi-finished tonewheel product 50.

Thereby, the inwardly curved sensing part 55 including the sensing holes 53 is pulled outwards by the lower mold punch 189. As a result, the finished tonewheel product 70 having the sensing part 75, which is uniform in sectional thickness and has a vertical straight-line shape, is obtained from the third semi-finished tonewheel product 50.

Meanwhile, as shown in FIG. 19, the upper mold die 187 of the restrike mold 180 has a rounded part R11 having a predetermined curvature at the corner where the base surface 187a and the inside surface 187b meet. The lower mold punch 189 has a rounded part R13 having a predetermined curvature at the corner where an upper surface 189a and an outside surface 189b meet. The rounded part R13 of the lower mold punch 189 has a curvature larger than the rounded part R11 of the upper mold die 187.

The upper mold die 187 is the component that functions to simply support the outside surface of the sensing part 55 of the third semi-finished tonewheel product 50 at the deformation recovery step. Thus, the upper mold die 187 has only to be smoothly moved downwards without scratching the outside surface of the sensing part 55 when the upper mold moves downwards.

Hence, the rounded part R11 of the upper mold die 187 may have a minimum curvature that satisfies design conditions.

However, the lower mold punch 189 is the component that directly restores the inwardly curved sensing part 55 of the third semi-finished tonewheel product 50 to its original state, at the deformation recovery step. Thus, the rounded part R13 of the lower mold punch 189 must have a radius of curvature which is at least several times as large as that of the rounded part R11 of the upper mold die 187.

The smaller the curvature of the rounded part R13 is, the more scratches will be formed on the inner surface of the sensing part 75 of the finished tonewheel product 70. Further, the flatness of the inner surface may not be precise.

Thus, when an intersection point P12 is fixed at a position at which a horizontal extension line L11 of the upper surface 189a of the lower mold punch 189 and a vertical extension line L12 of the outside surface 189b meet, a point P11 where the rounded part R13 starts on the upper surface 189a of the bottom mold 189 is preferably set to a point which is spaced apart from the intersection point P12 by an interval which is two to three times as large as the maximum inward protruding length C11 of the sensing part 55 on the third semi-finished tonewheel product 50 and is located along the horizontal extension line L11. However, the point P11 is not limited to the above-mentioned position.

Further, the point P13 where the rounded part R13 starts on the outside surface 189b of the lower mold punch 189 is preferably set to a point which is spaced apart from the intersection point P12 by an interval which is four to five times as large as the protruding length C11, and is located along the vertical extension line L12. However, the point P13 is not limited to the above-mentioned position.

In order to prevent the upper mold die 187 from being damaged and enhance the quality of the finished tonewheel product 70 at the deformation recovery step, the entire surface of the upper mold die 187 used in the restrike mold 180 is coated. In this case, the coating process is carried out using hard chrome plating, which has hardness lower than that of tin coating used for the upper mold die 157 at the preliminary forming step.

Figure 1:
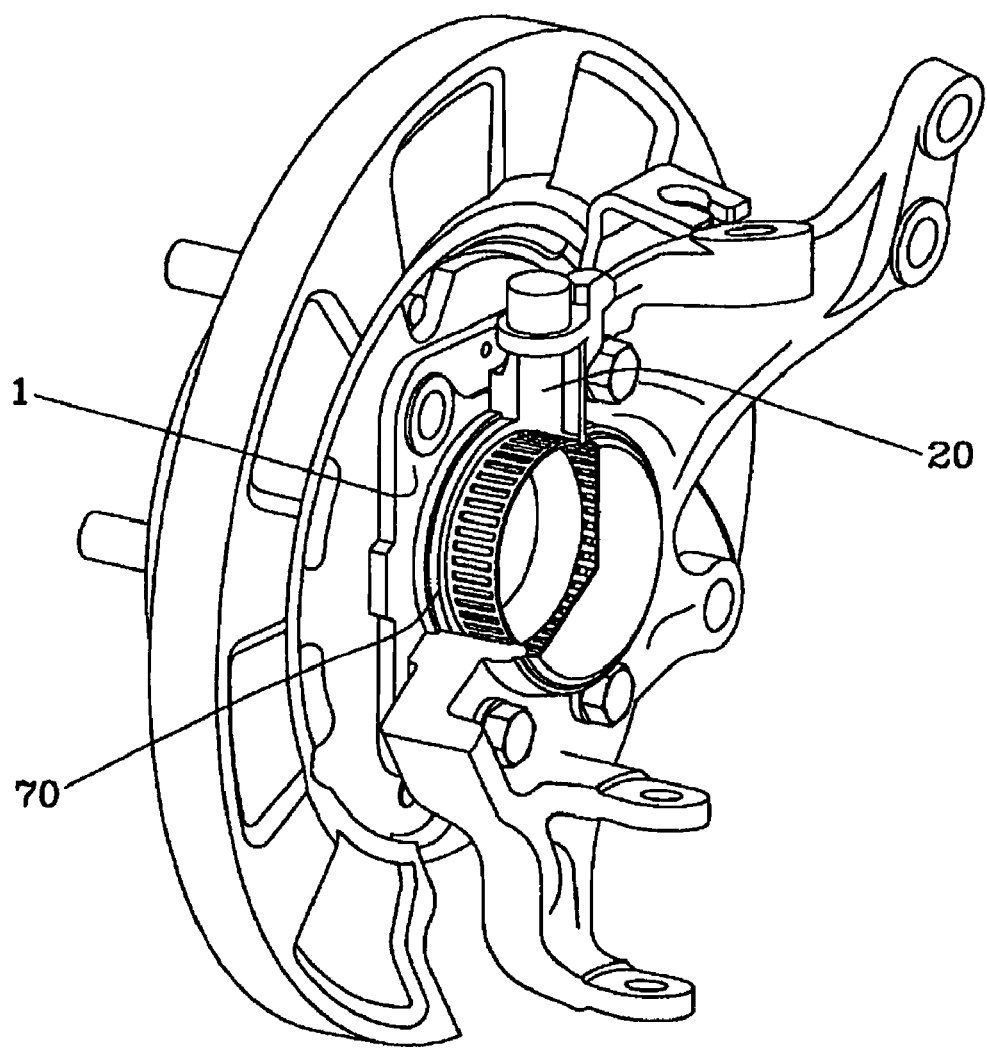
FIG. 1 is a perspective view showing the use of a tonewheel.
Figure 2:
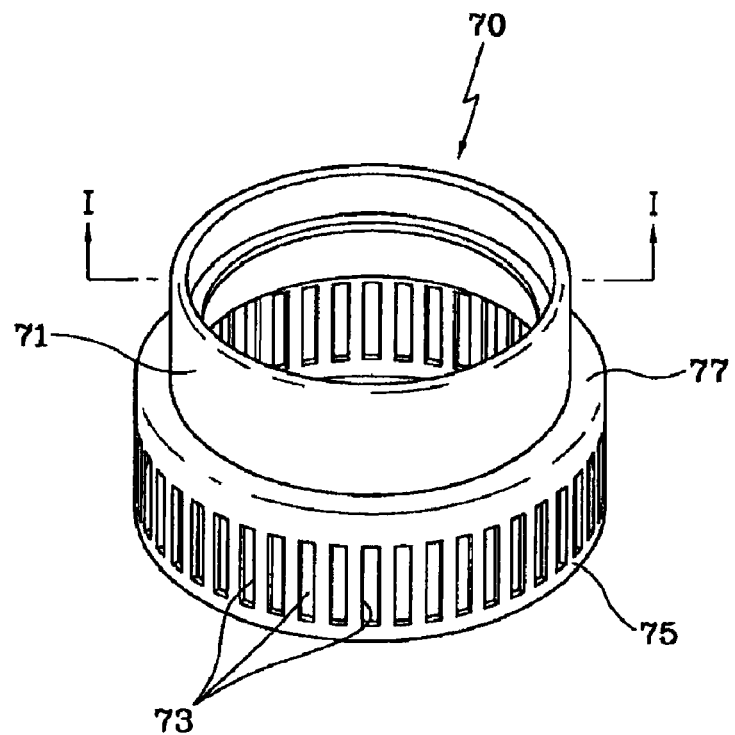
FIGS. 2 and 3 are a perspective view and a vertical sectional view of the tonewheel adapted to FIG. 1, respectively.
Figure 3:
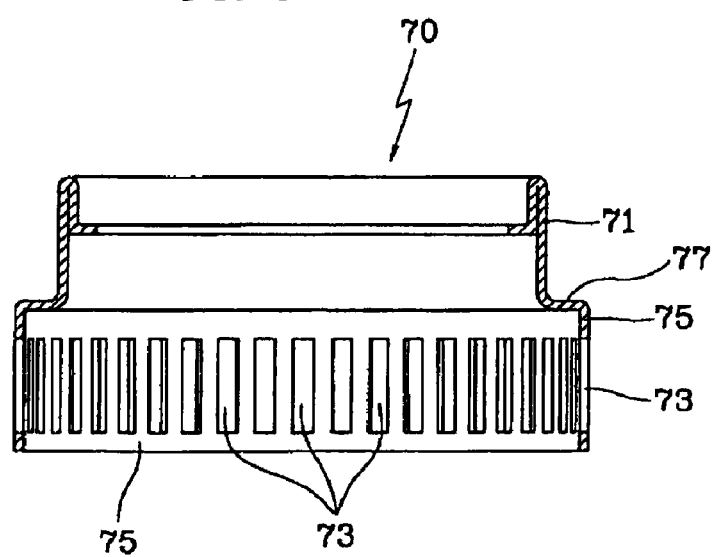

As such, when the finished tonewheel product 70 obtained through the deformation recovery step is taken out of the restrike mold 180, the manufacture of the tonewheel 70 shown in FIGS. 2 and 3 is completed.

Thus, the finished tonewheel product 70 is manufactured through the steps of this invention such that the sensing part 75 has uniform sectional thickness and precise surface flatness. Thereby, a high degree of uniformity of the shapes and intervals of the sensing holes 73 formed in the sensing part 75 is achieved.

As a result, the performance of the finished tonewheel product 70 is remarkably improved, and in addition, the performance of ABS, TCS, and VDC using the tonewheel 70 becomes superior.

What is claimed is:

1. A method of manufacturing a tonewheel for vehicles, comprising:
   a forming step comprising machining a material into a tonewheel shape;
   wherein the forming step includes:
      a shaping step comprising shaping the material through a progressive mold, thereby forming a semi-finished tonewheel shape having a boss, a sensing part, and a coupling part; and
      a uniformization step comprising machining the semi-finished tonewheel shape through a strike mold, thereby forming the tonewheel shape, wherein the sensing part of the tonewheel shape has a uniform sectional thickness in a vertical direction and an outside surface which is precisely flat;
   a sensing-hole machining step comprising machining the tonewheel shape to form a plurality of sensing holes at regular intervals in a circumferential direction of the sensing part of the tonewheel shape, thereby forming a semi-finished tonewheel product having the sensing part with the plurality of sensing holes; and
   a deformation recovery step comprising processing the sensing part of the semi-finished tonewheel product through a restrike mold, thereby removing deformation created during the sensing-hole machining step, thereby forming a finished tonewheel.

2. The method according to claim 1, wherein the uniformization step further comprises pressing an outer circumferential surface of the sensing part of the semi-finished tonewheel shape inwards with an upper mold die provided on the strike mold, thus forming the tonewheel shape.

3. The method according to claim 1, wherein machining the tonewheel shape to form the plurality of sensing holes at the sensing-hole machining step comprises machining the tonewheel shape through a cam piercing mold.

4. The method according to claim 1, wherein the deformation recovery step further comprises pressing an inside surface of the sensing part of the semi-finished tonewheel product outwards with a lower mold punch provided on the restrike mold, thus removing the deformation and forming the finished tonewheel.

5. The method according to claim 1, wherein the sensing part of the finished tonewheel has a uniform sectional thickness in a vertical direction and an outside surface which is precisely flat.

* * * * *